United States Patent
Hatch (10) Patent No.: US 10,662,935 B2
(45) Date of Patent: May 26, 2020

(54) POPPET VALVE ASSEMBLY (71) Applicant: DRESSER-RAND COMPANY, Olean, NY (US)

(72) Inventor: Glenn D. Hatch, Corning, NY (US)

(73) Assignee: DRESSER-RAND COMPANY, Olean, NY (US)

( * ) Notice: Subject to any disclaimer, the term of this patent is extended or adjusted under 35 U.S.C. 154(b) by 0 days.

(21) Appl. No.: 16/301,316

(22) PCT Filed: Jun. 28, 2017

(86) PCT No.: PCT/US2017/039696
§ 371 (c)(1),
(2) Date: Nov. 13, 2018

(87) PCT Pub. No.: WO2018/022240
PCT Pub. Date: Feb. 1, 2018

(65) Prior Publication Data
US 2019/0195214 A1 Jun. 27, 2019

Related U.S. Application Data

(60) Provisional application No. 62/366,004, filed on Jul. 23, 2016.

(51) Int. Cl.
*F04B 39/10* (2006.01)
*F04B 53/10* (2006.01)
(Continued)

(52) U.S. Cl.
CPC ...... *F04B 39/1013* (2013.01); *F04B 53/1025* (2013.01); *F04B 53/1092* (2013.01);
(Continued)

(58) Field of Classification Search
CPC ... F04B 53/129; F04B 39/1013; F16K 15/026
(Continued)

(56) References Cited

U.S. PATENT DOCUMENTS

2001/0039966 A1* 11/2001 Walpole .............. F04B 39/1053
137/512.1

FOREIGN PATENT DOCUMENTS

| EP | 2549160 A1 | 1/2013 |
|---|---|---|
| GB | 2361290 A | 10/2001 |
| WO | 2014159502 A1 | 10/2014 |

OTHER PUBLICATIONS

PCT International Search Report and Written Opinion of International Searching Authority dated Oct. 11, 2017 corresponding to PCT International Application No. PCT/US2017/039696 filed Jun. 28, 2017.

* cited by examiner

*Primary Examiner* — P. Macade Nichols (57) ABSTRACT

A poppet valve assembly including a valve seat defining at least one inlet port configured to receive a working fluid, a valve guard coupled to or integral with the valve seat and defining at least one outlet port configured to discharge the working fluid therefrom, and a valve member disposed in a guide pocket defined in the valve guard. The valve member may include a primary impact surface configured to contact a planar surface of the valve guard facing the valve seat. The valve member may also include a secondary impact surface configured to contact a bottom portion of the valve guard within the guide pocket after a structural failure of the primary impact surface prevents substantially all of the primary contact surface from contacting the planar surface.

17 Claims, 5 Drawing Sheets

(51) Int. Cl.
 *F04B 53/12* (2006.01)
 *F16K 15/02* (2006.01)
(52) U.S. Cl.
 CPC .... *F04B 53/129* (2013.01); *F04B 2201/0603* (2013.01); *F16K 15/026* (2013.01)
(58) Field of Classification Search
 USPC ........................................................ 137/540
 See application file for complete search history.

POPPET VALVE ASSEMBLY

This application claims the benefit of U.S. Provisional Patent Application having Ser. No. 62/366,004, which was filed Jul. 23, 2016. The aforementioned patent application is hereby incorporated by reference in its entirety into the present application to the extent consistent with the present application.

Reciprocating compressors generally utilize the rectilinear motion of a piston within a cylinder to compress a working fluid. Poppet valve assemblies may be used as inlet and outlet valves in a reciprocating compressor to regulate the flow of gas into and out of the cylinder. Generally, a poppet valve assembly includes a valve body having a valve seat defining an opening for fluid flow and a plug or valve member, usually in the form of a disk shaped head disposed at the end of a shaft or stem. The stem may guide the head to seal against the opening in the valve seat. Some poppet valve assemblies may include springs to provide sealing force and may further rely on a pressure differential between the two sides of the head for actuation. Other poppet valves assemblies may be actuated by a solenoid and/or another actuator.

During operation of the reciprocating compressor, the valve member may be opened and closed during the suction stroke and compression stroke, respectively, multiple times per second. The reciprocating motion of the valve member may lead to failure of the poppet valve assembly, thereby affecting the performance of the reciprocating compressor. A typical failure of the poppet valve assembly may be caused by the repeated impact forces exerted on the valve member, which typically occur where an end portion of the stem impacts the valve body during the suction stroke, i.e., during the opening of the poppet valve assembly. Accordingly, in such circumstances, the reciprocating compressor has to be taken off-line for repair or replacement of the poppet valve assembly.

What is needed, therefore, is a more robust poppet valve assembly for use in flow control systems, e.g., reciprocating compressors, that is less prone to failure such that repair or replacement thereof is reduced.

Embodiments of the disclosure may provide a poppet valve assembly. The poppet valve assembly may include a valve body. The valve body may include a valve seat defining at least one inlet port extending therethrough. The at least one inlet port may have an inlet port center axis and may be configured to receive a working fluid. The valve body may also include a valve guard defining at least one outlet port extending therethrough. The at least one outlet port may have an outlet port center axis and may be configured to discharge the working fluid therefrom. The poppet valve assembly may also include a valve member having a valve member center axis coaxial with the inlet port center axis. The valve member may be disposed in a guide pocket defined in the valve guard. The valve member may include a valve stem including a first end portion, a second end portion axially opposing the first end portion, and a cylindrical sidewall extending along the valve member center axis between the first end portion and the second end portion. The valve member may also include a valve head disposed at the first end portion of the valve stem. The valve head may be configured to reciprocate between contact with the valve seat and contact with the valve guard to regulate a flow of the working fluid from the at least one inlet port to the at least one outlet port. A gap may be formed between a bottom portion of the valve guard and the second end portion of the valve stem within the guide pocket when contact between the valve head and the valve guard occurs.

Embodiments of the disclosure may further provide a poppet valve assembly. The poppet valve assembly may include a valve seat defining at least one inlet port extending therethrough. The at least one inlet port may have an inlet port center axis and may be configured to receive a working fluid. The valve body may also include a valve guard coupled to or integral with the valve seat. The valve guard may have a planar surface facing the valve seat and defining at least one outlet port configured to discharge the working fluid therefrom. The poppet valve assembly may also include a valve member having a valve member center axis coaxial with the inlet port center axis. The valve member may be disposed in a guide pocket defined in the valve guard, and the valve member may include a primary impact surface configured to contact the planar surface of the valve guard. The valve member may also include a secondary impact surface configured to contact a bottom portion of the valve guard within the guide pocket after a structural failure of the primary impact surface prevents substantially all of the primary contact surface from contacting the planar surface.

Embodiments of the disclosure may further provide a compressor including a compression cylinder and a piston configured to be driven by a crankshaft and translated within the compression cylinder in a reciprocating motion. The compressor may also include a valve assembly configured to regulate flow of a working fluid into or out of the compression cylinder. The valve assembly may include a valve body. The valve body may include a valve seat defining at least one inlet port extending therethrough. The at least one inlet port may have an inlet port center axis and may be configured to receive a working fluid. The valve body may also include a valve guard defining at least one outlet port extending therethrough. The at least one outlet port may have an outlet port center axis and may be configured to discharge the working fluid therefrom. The valve assembly may also include a valve member having a valve member center axis coaxial with the inlet port center axis. The valve member may be disposed in a guide pocket defined in the valve guard. The valve member may include a valve stem including a first end portion, a second end portion axially opposing the first end portion, and a cylindrical sidewall extending along the valve member center axis between the first end portion and the second end portion. The valve member may also include a valve head disposed at the first end portion of the valve stem. The valve head may be configured to reciprocate between contact with the valve seat and contact with the valve guard to regulate a flow of the working fluid from the at least one inlet port to the at least one outlet port. A gap may be formed between a bottom portion of the valve guard and the second end portion of the valve stem within the guide pocket when contact between the valve head and the valve guard occurs.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 1:
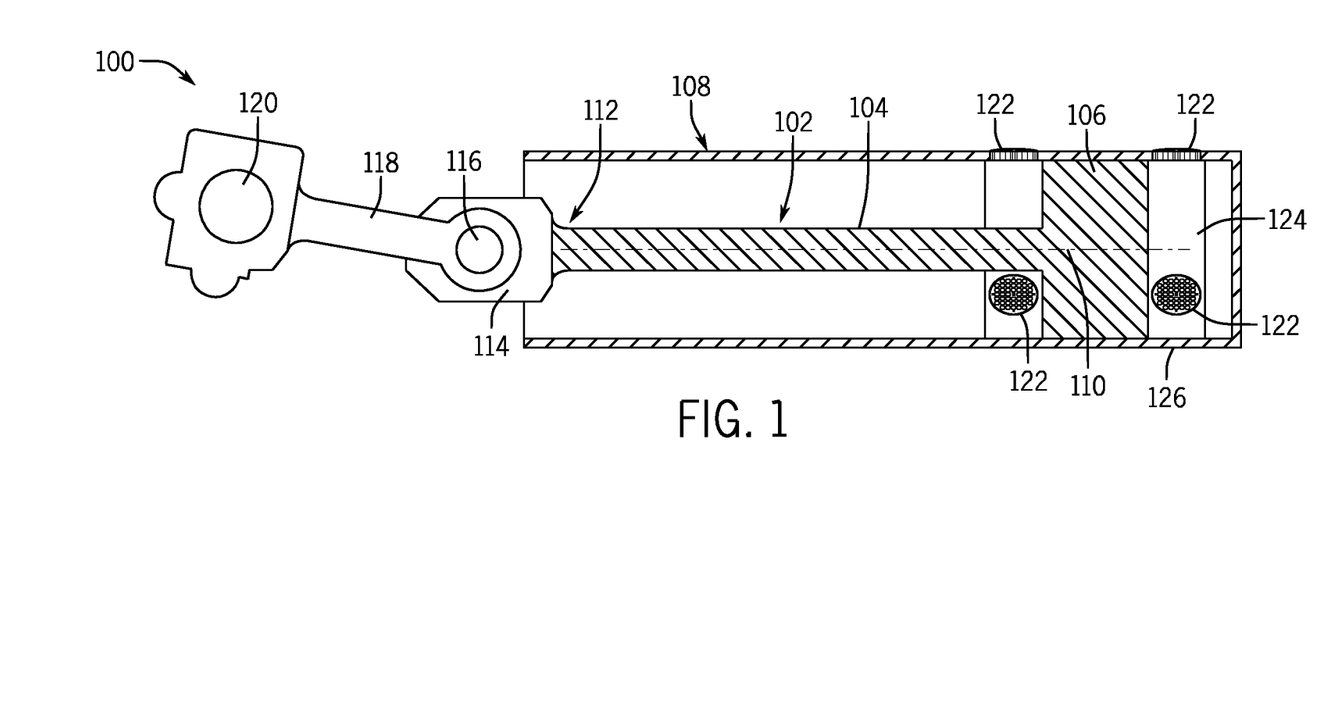
FIG. 1 illustrates a partial cross-section view of a compressor, according to one or more embodiments.

FIG. 1 illustrates a partial cross-section view of a compressor 100, according to one or more embodiments. As illustrated, the compressor 100 may be a reciprocating compressor, such as an API618 Process Reciprocating Compressor, manufactured by Dresser-Rand of Houston, Tex. The compressor 100 may include a piston 102 having a piston rod 104 coupled with or integral with a piston head 106. The piston rod 104 may provide the piston head 106 with a reciprocating motion within a cylinder 108 of the compressor 100. The reciprocating motion of the piston head 106 may compress a working fluid introduced in the cylinder 108, thereby provided compressed working fluid to other process machinery (not shown) for use in refining, gas transmission and storage, gas injection, and the like. Illustrative working fluids may include, but are not limited to, hydrogen, carbon dioxide, methane, ethylene, or mixtures of hydrocarbons.

The piston 102 may have a longitudinal axis 110, such that the piston rod 104 extends along the longitudinal axis 110 terminating in the piston head 106 at one end portion and a connecting end 112 at the other end portion, where the connecting end 112 is configured to couple with a crosshead 114. In operation, the piston 102 translates along the longitudinal axis 110 in order to move the piston head 106 in the cylinder 108 in a reciprocating motion to compress the working fluid. A crosshead pin 116 may couple the crosshead 114 with one end of a connecting rod 118, which may be operatively connected at an opposing end to a crankshaft 120.

The crankshaft 120 may be operatively coupled to a drive shaft (not shown) of a driver (not shown). The driver may be configured to provide the crankshaft 120 with rotational energy, which may be translated to the reciprocating motion utilized to drive the piston 102 and the compressor 100. In an exemplary embodiment, the drive shaft may be integral with or coupled with the crankshaft 120, such that the rotational energy of the drive shaft is imparted to the crankshaft 120. The drive shaft may be coupled with the crankshaft 120 via a gearbox (not shown) including a plurality of gears configured to transmit the rotational energy of the drive shaft to the crankshaft 120, such that the drive shaft and the crankshaft 120 may spin at the same speed, substantially similar speeds, or differing speeds and rotational directions.

The driver may be a motor and more specifically may be an electric motor, such as a permanent magnet motor, and may include a stator (not shown) and a rotor (not shown). It will be appreciated, however, that other embodiments may employ other types of electric motors including, but not limited to, synchronous motors, induction motors, and brushed DC motors. The driver may also be a hydraulic motor, an internal combustion engine, a steam turbine, a gas turbine, or any other device capable of driving the crankshaft either directly or through a power train.

As further illustrated in FIG. 1, the compressor 100 may include a plurality of valve assemblies 122. One or more of the valve assemblies 122 may be arrayed around a piston chamber 124 defined by a housing 126 of the cylinder 108. Accordingly, the valve assemblies 122 may be configured to regulate the flow of working fluid into the piston chamber 124 via one or more suction ducts (not shown) and/or out of the piston chamber 124 via one or more discharge ducts (not shown). In operation, the piston rod 104 may slide with a reciprocating motion in the cylinder 108 to suck the working fluid from at least one suction duct and discharge the fluid at a higher pressure in at least one discharge duct. Accordingly, a respective valve assembly 122 may be arranged in each of the suction duct(s) and discharge duct(s).

Figure 2A:
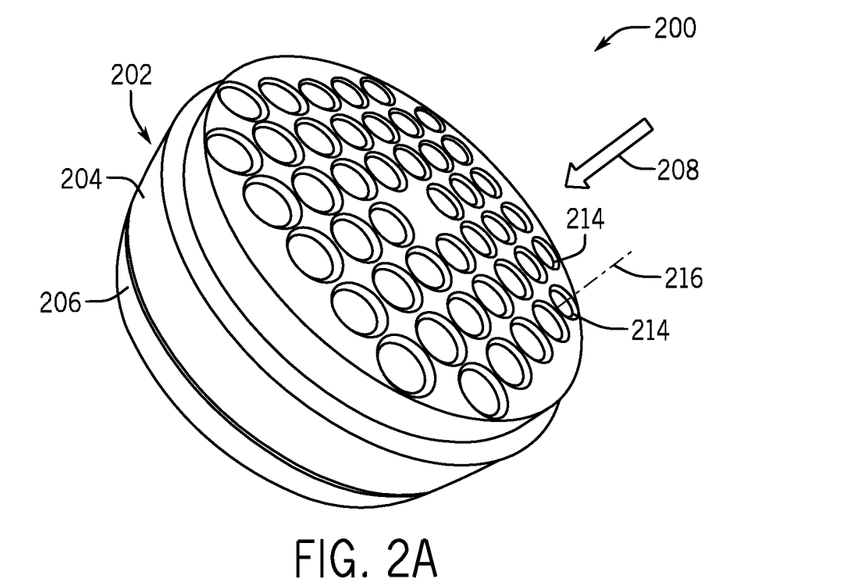
FIG. 2A illustrates a perspective view of a valve body of an exemplary poppet valve assembly which may be used in a flow control system, such as the compressor of FIG. 1, according to one or more embodiments.

FIG. 2A illustrates a perspective view of an exemplary poppet valve assembly 200 which may be used in a flow control system, such as the compressor 100 of FIG. 1, according to one or more embodiments. Although the poppet valve assembly 200 may be used in place of any of the valve assemblies 122 utilized in the compressor 100 as disclosed herein, it will be appreciated that the poppet valve assembly 200 is not limited thereto and may be utilized in other suitable environments known to those of skill in the art. As in one or more embodiments the poppet valve assembly 200 may operate based on the pressure differential across the poppet valve assembly 200, the poppet valve assembly 200 may be referred to in such embodiments as a "differential pressure valve" or a "pressure-relief valve."

The poppet valve assembly 200 may include a valve body 202 having an inlet side portion, referred to herein as the valve seat 204, and an outlet side portion, referred to herein as the valve guard 206. Accordingly, flow of the working fluid through the poppet valve assembly 200 may be in the direction indicated by arrow 208. The term "valve body" may be used to refer to the outer housing of the valve assembly that contains various working portions. As shown at least in the exemplary embodiment of FIG. 2A, the valve body 202 may include the valve seat 204 and the valve guard 206. In at least one embodiment, the valve body 202 may be formed from the coupling of the valve seat 204 and the valve guard 206 via one or more fasteners (not shown). The valve seat 204 and the valve guard 206 may include a variety of materials chosen based on the application for the poppet valve assembly 200. For example, the valve seat 204 and the valve guard 206 may include or be constructed from metal or plastic. In applications with a corrosive fluid, e.g., seawater, acid, and/or high temperature fluids, the materials may be chosen to resist those corrosive properties.

Figure 2B:
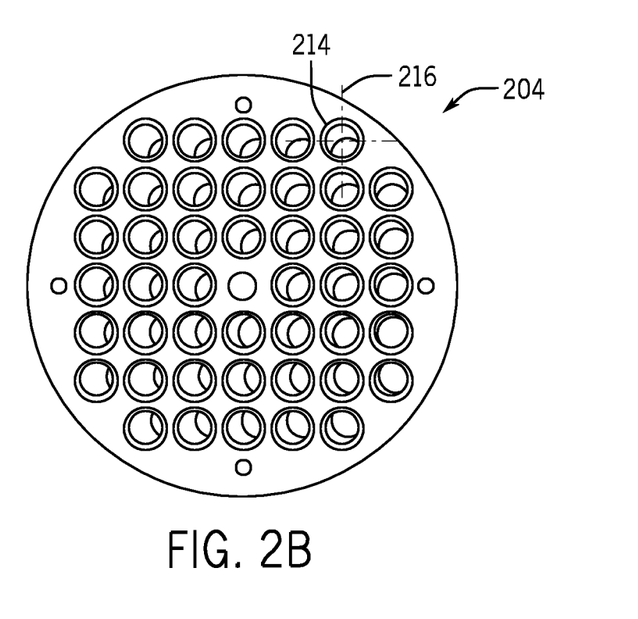
FIG. 2B illustrates a front view of a valve seat of the valve body of FIG. 2A, according to one or more embodiments.
Figure 2C:
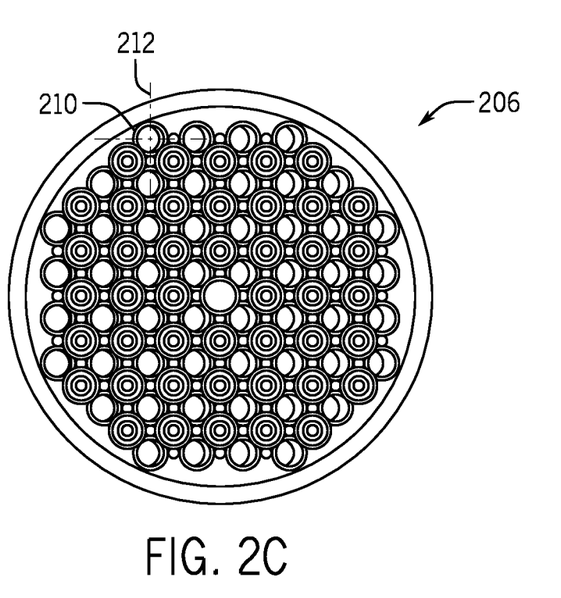
FIG. 2C illustrates a front view of a valve guard of the valve body of FIG. 2A, according to one or more embodiments.

FIGS. 2B and 2C illustrate respective front views of the valve seat 204 and the valve guard 206 of the valve body 202 of FIG. 2A, according to one or more embodiments. As shown most clearly in FIG. 2C, the valve guard 206 may define one or more outlet fluid conduits or ports 210, each outlet port 210 having an outlet port center axis 212. As shown by the direction of arrow 208 in FIG. 2A, working fluid may exit the poppet valve assembly 200 via the outlet ports 210. The arrangement of the outlet ports 210 may be chosen based on fluid dynamic properties desired for the valve assembly. For example, the number, size, and spacing of the outlet ports may vary depending on expected fluid pressure, volume flow rate, etc. Accordingly, those of skill in the art will appreciate that the outlet ports 210 may range from one outlet port 210 to an array of outlet ports 210, as shown in FIG. 2C. In some embodiments, the outlet ports 210 may include shaped edges to reduce exit losses for the working fluid exiting the poppet valve assembly 200.

Likewise, in an exemplary embodiment, the valve seat 204 of the poppet valve assembly 200 may define a plurality of inlet fluid conduits or ports 214, each inlet port 214 having an inlet port center axis 216. As shown in FIGS. 2A and 2B, the inlet ports 214 may be arrayed in the valve seat 204 of the valve body 202. As indicated by the direction of arrow 208, the working fluid may flow into the poppet valve assembly 200 via the inlet ports 214. An arrangement of the inlet ports 214 may be chosen based on the fluid dynamic properties desired for the poppet valve assembly 200. For example, the number, size, and spacing of the inlet ports 214 may vary depending on expected fluid pressure, volume flow rate, etc. Accordingly, although the valve seat 204 as illustrated in FIGS. 2A and 2B defines a plurality of inlet ports 214, embodiments in which the poppet valve assembly 200 includes a single inlet port 214 are contemplated herein. In some cases, the inlet ports 214 may include rounded edges to reduce entrance losses for the working fluid entering the poppet valve assembly 200.

Figure 3:
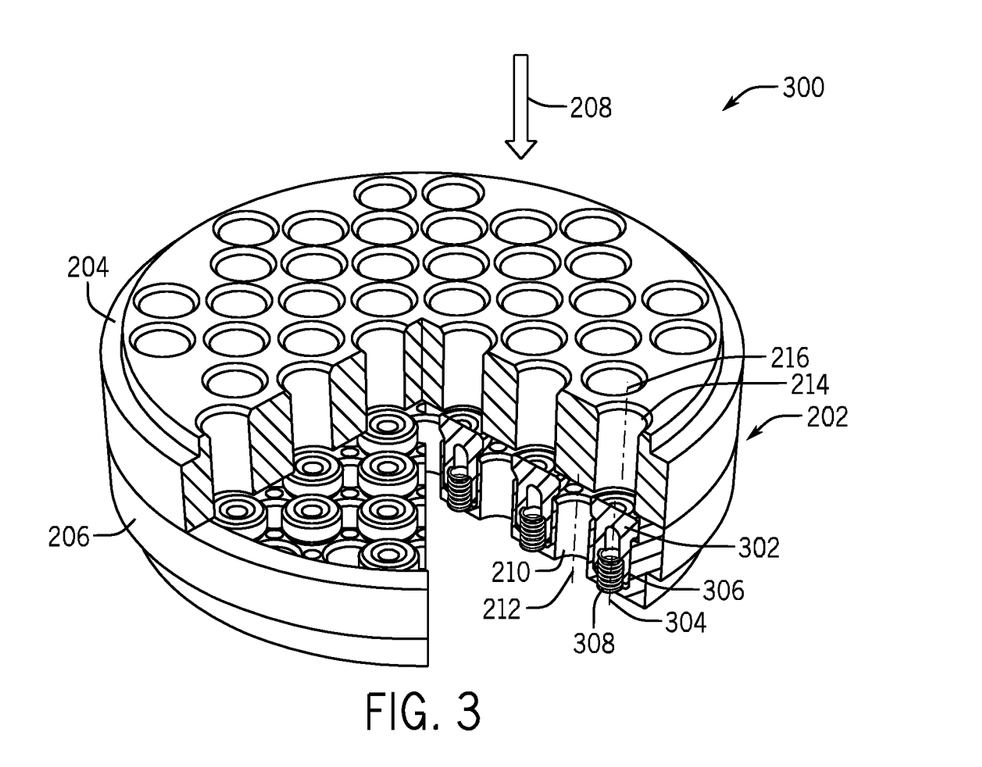
FIG. 3 illustrates an isometric view of another exemplary poppet valve assembly, with portions removed for visibility, which may be used in a flow control system, such as the compressor of FIG. 1, according to the one or more embodiments.

FIG. 3 illustrates an isometric view of another exemplary poppet valve assembly 300, with portions removed for visibility, which may be used in a flow control system, such as the compressor 100 of FIG. 1, according to one or more embodiments. The poppet valve assembly 300 may be used in place of any of the valve assemblies 122 of FIG. 1 and is similar in some respects to the poppet valve assembly 200 shown in FIGS. 2A-2C. Accordingly, the poppet valve assembly 300 may be best understood with reference to the poppet valve assembly 200, where like numerals are used to designate like components.

The poppet valve assembly 300 may include a single valve member 302, or a plurality of valve members 302 arrayed within the valve body 202, each valve member 302 having a longitudinally-extending, valve member center axis 304. In some embodiments, such as that shown in FIG. 3, an array of the valve members 302 may correspond to the array of inlet ports 214, and each valve member center axis 304 may be coaxial with a respective inlet port center axis 216. In such embodiments, as illustrated in FIG. 3, the array of inlet ports 214 and the array of outlet ports 210 may be arranged such that the inlet port center axes 216 and the outlet port center axes 212 may be offset from one another. Each valve member 302 may be mounted in a respective guide pocket 306 defined by the valve guard 206 of the valve body 202. In the arrangement shown in FIG. 3, working fluid flowing in the direction of arrow 208 may enter the poppet valve assembly 300 through the inlet ports 214, impinge on the respective valve members 302, and exit the poppet valve assembly 300 through the outlet ports 210.

In addition to the aforementioned, the poppet valve assembly 300 may include a single biasing member 308, or a plurality of biasing members 308, such that each biasing member 308 may be disposed in a respective guide pocket 306 and configured to actuate the valve member 302 disposed in the respective guide pocket 306. As illustrated in FIG. 3, the biasing members 308 may each be a helical compression spring. In other embodiments, different biasing members 308 may be used. For example, the biasing member 308 may be or include Belleville springs. In other embodiments, the biasing member 308 may be or include a magnet.

Figure 4:
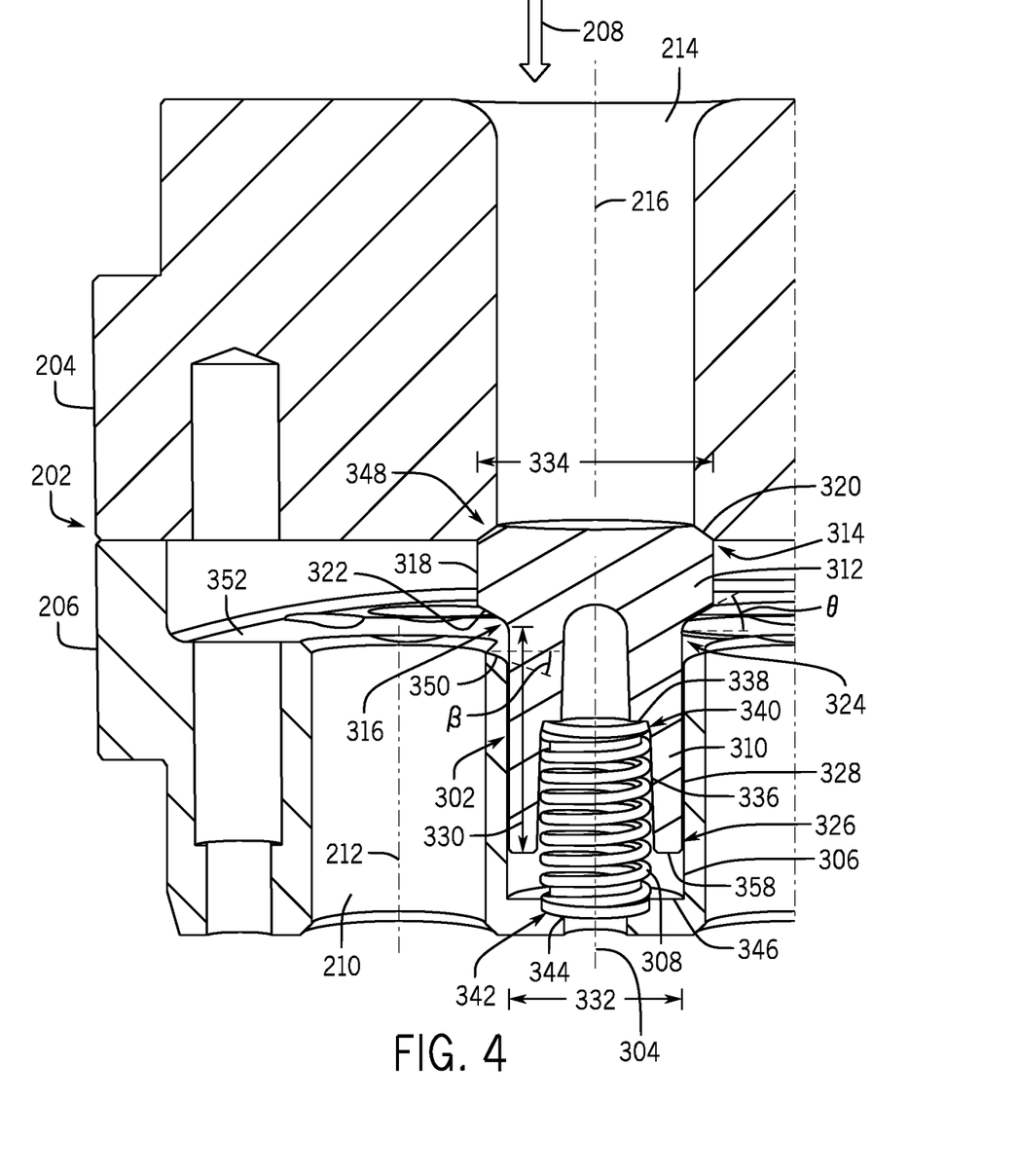
FIG. 4 is a cross section view of a portion of the valve assembly of FIG. 3, showing a single valve member and the associated portions of the valve assembly in a valve closed position, according to one or more embodiments
Figure 5:
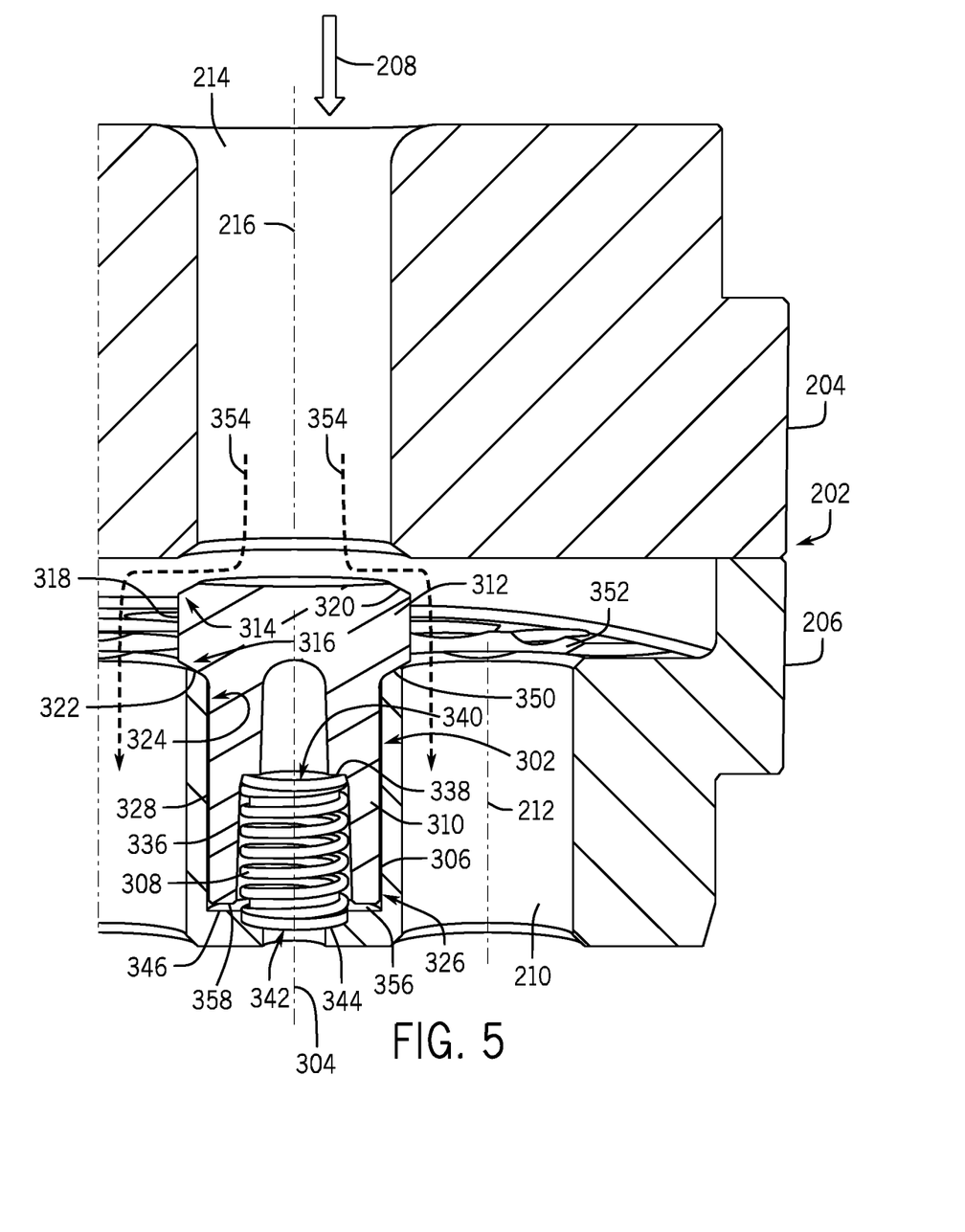
FIG. 5 is a cross section view of a portion of the valve assembly of FIG. 3, showing the single valve member and the associated portions of the valve assembly in a valve opened position, according to one or more embodiments.

FIG. 4 is a cross section view of a portion of the poppet valve assembly 300 of FIG. 3, showing a single valve member 302 and the associated portions of the poppet valve assembly 300 in a valve closed position, according to one or more embodiments. FIG. 5 is a cross section view of a portion of the poppet valve assembly 300 of FIG. 3, showing the single valve member 302 and the associated portions of the poppet valve assembly 300 in a valve opened position, according to one or more embodiments. As shown in FIGS. 4 and 5, the poppet valve assembly 300 includes the valve body 202 having the valve seat 204 coupled with the valve guard 206. The valve member 302 may be mounted in the guide pocket 306 defined in the valve guard 206, and the biasing member 308 may be disposed within the guide pocket 306 and configured to actuate the valve member 302.

In an exemplary embodiment, the valve member 302 may include a valve stem 310 and a valve head 312 disposed at one end of the valve stem 310. The valve head 312 may be generally cylindrical and may have a first end portion 314 and a second end portion 316 separated by a cylindrical sidewall 318 extending therebetween along the valve member center axis 304. In an exemplary embodiment, the first end portion 314 may be distal the valve stem 310 and may be chamfered about the circumference thereof to form a seating surface 320. The chamfer (seating surface 320) may put the valve head 312 in compression upon impact with the valve seat 204, as shown in FIG. 4. The second end portion 316 of the valve head 312 may be disposed adjacent the valve stem 310 and may be chamfered about the circumference thereof to form a primary impact surface 322. The chamfer (primary impact surface 322) may put the valve head 312 in compression upon impact with the valve guard 206, as shown in FIG. 5.

The valve stem 310 may be generally cylindrical and may include a first end portion 324 adjacent the valve head 312, a second end portion 326 distal the valve head 312, and a cylindrical sidewall 328 extending therebetween along the valve member center axis 304 and having a length 330. The outer diameter of the valve stem 310 may be referred to as the valve stem diameter 332. Likewise, the outer diameter of the valve head 312 may be referred to as the valve head diameter 334. The ratio of valve head diameter 334 to valve stem diameter 332 or "head to stem ratio" may, at least in part, define some aspects of the efficiency of the poppet valve assembly 300. For example, a relatively low head to stem ratio may reduce any overlap of the outlet ports 210 in the valve guard 206 of the poppet valve assembly 300. Reducing any overlap of the outlet ports 210 may increase the effective flow area associated with the outlet ports 210. At the same time, however, a lower head diameter 334 may reduce the available seating surface 320 or "seating area" for the valve member 302. Reduced seating area may increase the rate of leakage and/or decrease the effectiveness of the poppet valve assembly 300.

The cylindrical sidewall 328 of the valve stem 310 may define a socket 336 extending axially inward from the second end portion 326 of the valve stem 310 along the valve member center axis 304. As illustrated in FIGS. 4 and 5, the socket 336 of the valve stem 310 may be configured to receive a respective biasing member 308, illustrated as a spring, therein. Disposed within the socket 336 may be a spring landing 338 for seating one end portion 340 of the spring 308 opposite a bottom of the guide pocket 306. The opposing end portion 342 of the spring 308 may be disposed in a recess 344 formed in a bottom portion 346 of the valve guard 206 at the bottom of the guide pocket 306. The socket 336 may be tapered, thereby providing for simpler installation of the spring 308, reduced stresses on the valve stem 302 during operation, reduced wear, and/or other benefits.

As shown most clearly in FIGS. 4 and 5, the valve seat 204 may be chamfered about the exit and/or end portion 348 of the respective inlet ports 214 to form a complement to the chamfer (seating surface 320) of the first end portion 314 of the valve head 312. In one or more embodiments, each end portion 348 of the respective inlet ports 214 may be configured to form a sealing relationship with a respective seating surface 320 of the valve member 302 when the poppet valve assembly 300 is in the closed position as illustrated in FIG. 4. In the closed position, each seating surface 320 of the poppet valve assembly 300 is pressed against the respective end portion 348 of the inlet ports 214 of the valve seat 204, thus preventing flow of the working fluid from exiting the inlet ports 214 and flowing through the outlet ports 210.

In an exemplary embodiment, a chamfer 350 may be formed in a planar surface 325 of the valve guard 206 around an end portion of the respective guide pocket 306 defined by the valve guard 206. In one or more embodiments, each chamfer 350 may be configured to contact the respective primary impact surface 322 of the valve head 312 during the opening of the poppet valve assembly 300 to allow working fluid to flow through the outlet ports 210. In the opened position, the biasing member 308 may be compressed, allowing the valve member 302 to recede into the guide pocket 306. When the valve member 302 recedes into the guide pocket 306, the primary impact surface 322 of each valve head 312 impacts and is urged against the respective chamfer 350 of the valve guard 206, thus allowing the working fluid to exit the outlet ports 210, as shown by dotted flow lines 354.

As shown most clearly in FIGS. 4 and 5, the primary impact surface 322 may extend between the cylindrical sidewall 328 of the valve stem 310 and the cylindrical sidewall 318 of the valve head 312. As such the primary impact surface 322 may have a chamfer angle θ in the range of about 20 degrees to about 40 degrees with respect to the planar surface 352 of the valve guard 206 facing the valve seat 204. In another embodiment, the chamfer angle θ may be in the range of about 25 degrees to about 35 degrees. In an exemplary embodiment, the chamfer angle θ may be about 30 degrees. In an exemplary embodiment, the chamfer angle β of the chamfer 350 formed in the planar surface 352 of the valve guard 206 may substantially correspond to the chamfer angle θ of the primary impact surface 322 such that the working fluid or other material, such as debris, is prevented from entering the guide pocket 306 and is thus directed out of the poppet valve assembly 300 via the outlet ports 210. The example tolerance range may provide the effects described above resulting in increased compressive loading on the valve stem 310 instead of tensile stresses which occur in the valve members known in the art.

As shown in FIG. 5, in the opened position, the primary impact surface 322 of each valve member 302 impacts and is urged against the respective chamfer 350 formed in the planar surface 352 of the valve guard 206. Thus, the second end portion 326 of the valve stem 310 does not contact the bottom portion 346 of the valve guard 206 and a gap 356 is formed between the second end portion 326 of the valve stem 310 and the bottom portion 346 of the valve guard 206 when the primary impact surface 322 is in contact with the respective chamfer 350 formed in the planar surface 352 of the valve guard 206. Due to the valve member 302 impacting the valve guard 206 at the primary impact surface 322 during the opening of the poppet valve assembly 300, the second end portion 326 of the valve stem 310 is prevented from contacting the bottom portion 346 of the valve guard 206, and thus, corresponding impact forces generated by such contact may be prevented. As such, the structural integrity of the valve stem 310 may be maintained and the longevity of the valve member 302 and the poppet valve assembly 300 may be increased compared to those valve members known in the art.

In an exemplary embodiment, the structural integrity of the valve head 312 at the primary impact surface 322 may be compromised after repeated impact forces exerted on the primary impact surface 322. In such circumstances, one or more portions of the valve head 312 may fracture, fragment, or otherwise be removed therefrom, such that the shape and form of the primary impact surface 322 is altered, thereby resulting in failure thereof. Accordingly, the second end portion 326 of the valve stem 310 may thus be configured to recede further into the guide pocket 306 such that the second end portion 326 may begin to contact the bottom portion 346 of the valve guard 206 at an auxiliary or secondary impact surface 358 upon failure of the primary impact surface 322, where the secondary impact surface 358 is a planar surface of the second end portion 326 of the valve stem 310 facing the bottom portion 346 of the valve guard 206. As such, the poppet valve assembly 300 may continue to function as intended until the structural integrity of the valve member 302 is compromised at the secondary impact surface 358 of the valve stem 310. Accordingly, in an exemplary embodiment, the poppet valve assembly 300 may include a primary impact surface 322 and a secondary impact surface 358, where the longevity of the poppet valve assembly 300 may be increased due to the poppet valve assembly 300 remaining operational until the structural integrity of the valve member 302 has been compromised at the primary impact surface 322 and the secondary impact surface 358.

In addition to the chamfer angle θ, the primary impact surface 322 of the valve head 312 may have a surface area defined as the area in contact with the valve guard 206. Accordingly, in an exemplary embodiment, the length 330 of the valve stem 310 may be dependent on the surface area of the primary impact surface 322, the chamfer angle θ of the primary impact surface 322, or both. It will be appreciated by those of skill in the art that the length 330 of the valve stem 310 will be calculated based on the foregoing so that the gap 356 is maintained between the second end portion 326 of the valve stem 310 and the bottom portion 346 of the valve guard 206 while the structural integrity of the primary impact surface 322 has not been compromised and the primary impact surface 322 is intact. The gap 356 allows for the primary impact surface 322 of the valve head 312 to contact the valve guard 206 without the secondary impact surface 358 of the valve stem 310 contacting the bottom portion 346 of the valve guard 206 and generating any associated impact forces.

The secondary impact surface 358 may have a surface area defined as the area in contact with the bottom portion 346 of the valve guard 206. A ratio of the surface area of the primary impact surface 322 to the surface area of the secondary impact surface 358 may be determined to provide for an increased lifespan of the valve member 302 and, correspondingly, the poppet valve assembly 300. In an exemplary embodiment, the ratio of the surface area of the primary impact surface 322 to the surface area of the secondary impact surface 358 may be determined to be about 2.5:1.25. In another embodiment, the ratio of the surface area of the primary impact surface 322 to the surface area of the secondary impact surface 358 may be determined to be about 2.5:1. In another embodiment, the ratio of the surface area of the primary impact surface 322 to the surface area of the secondary impact surface 358 may be determined to be about 1.5:1.

It should be appreciated that all numerical values and ranges disclosed herein are approximate valves and ranges, whether "about" is used in conjunction therewith. It should also be appreciated that the term "about," as used herein, in conjunction with a numeral refers to a value that is +/−5% (inclusive) of that numeral, +/−10% (inclusive) of that numeral, or +/−15% (inclusive) of that numeral. It should further be appreciated that when a numerical range is disclosed herein, any numerical value falling within the range is also specifically disclosed.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

I claim:

1. A poppet valve assembly, comprising:
   a valve body comprising
      a valve seat defining at least one inlet port extending therethrough, the at least one inlet port having an inlet port center axis and configured to receive a working fluid; and
      a valve guard defining at least one outlet port extending therethrough, the at least one outlet port having an outlet port center axis and configured to discharge the working fluid therefrom; and
   a valve member having a valve member center axis coaxial with the inlet port center axis, the valve member disposed in a guide pocket defined in the valve guard, and the valve member comprising
      a valve stem comprising a first end portion, a second end portion axially opposing the first end portion, and a cylindrical sidewall extending along the valve member center axis between the first end portion and the second end portion; and
      a valve head having a cylindrical sidewall extending along the valve member center axis, a first end portion configured to contact the valve seat, and a second end portion adjacent the valve stem and forming a chamfer configured to contact the valve guard, the valve head disposed at the first end portion of the valve stem, the valve head configured to reciprocate between contact with the valve seat and contact with the valve guard to regulate a flow of the working fluid from the at least one inlet port to the at least one outlet port,
   wherein a gap is formed between a bottom portion of the valve guard and the second end portion of the valve stem within the guide pocket when contact between the valve head and the valve guard occurs.

2. The poppet valve assembly of claim 1, wherein the valve assembly is configured such that the second end portion of the valve stem contacts the bottom portion of the valve guard after a structural failure of the chamfer prevents contact with a corresponding chamfer of the valve guard.

3. The poppet valve assembly of claim 1, wherein the chamfer has a chamfer angle of about 25 degrees to about 35 degrees with respect to a planar surface of the valve guard facing the valve seat.

4. The poppet valve assembly of claim 1, wherein:
   the second end portion of the valve stem has a surface area;
   the chamfer of the valve head has a surface area; and
   a ratio of the surface area of the chamfer to the surface area of the second end portion of the valve stem is about 2.5:1.25.

5. The poppet assembly of claim 1, wherein a corresponding chamfer is formed in a planar surface of the valve guard about an end portion of the guide pocket defined by the valve guard.

6. The poppet assembly of claim 5, wherein the corresponding chamfer has a chamfer angle of about 25 degrees to about 35 degrees with respect to the planar surface of the valve guard facing the valve seat.

7. The poppet valve assembly of claim 1, further comprising a biasing member disposed in a socket defined by the valve stem, the socket extending axially inward from the second end portion of the valve stem and configured to bias the valve member in contact with the valve seat.

8. The poppet valve assembly of claim 7, wherein the biasing member is a spring comprising a first end portion and a second end portion axially opposing the first end portion of the spring along the valve member center axis, the first end portion of the spring being disposed on a landing formed by the valve stem within the socket and the second end portion of the spring being disposed within a recess defined by the bottom portion of the valve guard.

9. The poppet valve assembly of claim 1, wherein the inlet port center axis and the outlet port center axis are offset from one another.

10. A poppet valve assembly, comprising:
a valve seat defining at least one inlet port extending therethrough, the at least one inlet port having an inlet port center axis and configured to receive a working fluid;
a valve guard coupled to or integral with the valve seat, the valve guard having a planar surface facing the valve seat and defining at least one outlet port configured to discharge the working fluid therefrom; and
a valve member having a valve member center axis coaxial with the inlet port center axis, the valve member disposed in a guide pocket defined in the valve guard, and the valve member comprising
a primary impact surface configured to contact the planar surface of the valve guard; and
a secondary impact surface configured to contact a bottom portion of the valve guard within the guide pocket after a structural failure of the primary impact surface prevents substantially all of the primary contact surface from contacting the planar surface, wherein the valve member comprises a valve head, and the primary impact surface is a chamfer formed in the valve head.

11. The poppet valve assembly of claim 10, wherein the valve member further comprises a valve stem extending axially from the chamfer formed in the valve head along the valve member center axis, and the secondary impact surface is a planar surface at an end portion of the valve stem axially opposing the chamfer formed in the valve head.

12. The poppet valve assembly of claim 11, wherein the chamfer has a chamfer angle of about 25 degrees to about 35 degrees with respect to the planar surface of the valve guard facing the valve seat.

13. The poppet valve assembly of claim 12, wherein a corresponding chamfer is formed in the planar surface of the valve guard about an end portion of the guide pocket defined by the valve guard, the corresponding chamfer having a chamfer angle of about 25 degrees to about 35 degrees with respect to the planar surface of the valve guard facing the valve seat.

14. The poppet valve assembly of claim, 13 wherein:
the primary impact surface has a surface area;
the secondary impact surface has a surface area; and
a ratio of the surface area of the primary impact surface to the surface area of the secondary impact surface is about 2.5:1.25.

15. The poppet valve assembly of claim 14, further comprising a biasing member disposed in a socket defined by the valve stem, the socket extending axially inward from the end portion of the valve stem and configured to bias the valve member in contact with the valve seat.

16. A compressor comprising:
a compression cylinder;
a piston configured to be driven by a crankshaft and translated within the compression cylinder in a reciprocating motion; and
a valve assembly configured to regulate flow of a working fluid into or out of the compression cylinder, the valve assembly comprising
a valve body comprising
a valve seat defining at least one inlet port extending therethrough, the at least one inlet port having an inlet port center axis and configured to receive the working fluid; and
a valve guard defining at least one outlet port extending therethrough, the at least one outlet port having an outlet port center axis and configured to discharge the working fluid therefrom; and
a valve member having a valve member center axis coaxial with the inlet port center axis, the valve member disposed in a guide pocket defined in the valve guard, and the valve member comprising
a valve stem comprising a first end portion, a second end portion axially opposing the first end portion, and a cylindrical sidewall extending along the valve member center axis between the first end portion and the second end portion; and
a valve head including a cylindrical sidewall extending along the valve member center axis, a first end portion configured to contact the valve seat, and a second end portion adjacent the valve stem and forming a chamfer configured to contact the valve guard, the valve head disposed at the first end portion of the valve stem, the valve head configured to reciprocate between contact with the valve seat and contact with the valve guard to regulate a flow of the working fluid from the at least one inlet port to the at least one outlet port,
wherein a gap is formed between a bottom portion of the valve guard and the second end portion of the valve stem within the guide pocket when contact between the valve head and the valve guard occurs.

17. The compressor of claim 16, wherein:
the second end portion of the valve stem has a surface area;
the chamfer of the valve head has a surface area; and
a ratio of the surface area of the chamfer to the surface area of the second end portion of the valve stem is about 2.5:1.25.

* * * * *